(12) United States Patent
Fujita

(10) Patent No.: US 8,360,676 B2
(45) Date of Patent: Jan. 29, 2013

(54) SHAFT SUPPORT STRUCTURE FOR A VEHICLE

(75) Inventor: Masayuki Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1294 days.

(21) Appl. No.: 11/601,665

(22) Filed: Nov. 20, 2006

(65) Prior Publication Data
US 2007/0114088 A1 May 24, 2007

(30) Foreign Application Priority Data
Nov. 24, 2005 (JP) ................................. 2005-338468

(51) Int. Cl.
*F16G 11/00* (2006.01)
(52) U.S. Cl. .......... 403/13; 403/14; 403/157; 403/408.1
(58) Field of Classification Search .................... 403/13, 403/14, 104, 150, 154, 157, 408.1; 180/227; 411/110, 435, 939, 383, 409
See application file for complete search history.

(56) References Cited

U.S. PATENT DOCUMENTS

| | | | |
|---|---|---|---|
| 1,182,861 A * | 5/1916 | Spencer | |
| 2,285,717 A * | 6/1942 | Indge | 411/435 |
| 3,669,393 A * | 6/1972 | Paine et al. | |
| 3,736,010 A * | 5/1973 | Larkin | 403/104 |
| 3,889,352 A * | 6/1975 | Bosse | |
| 5,511,760 A * | 4/1996 | Kambara | |
| 5,704,572 A * | 1/1998 | Vogel et al. | 411/383 |
| 6,315,071 B1 | 11/2001 | Gogo | |
| 7,163,365 B2 * | 1/2007 | Manaka et al. | 411/374 |
| 2003/0015365 A1 | 1/2003 | Miyashiro | |
| 2004/0254023 A1* | 12/2004 | Manaka et al. | |
| 2006/0278458 A1* | 12/2006 | Toyoda | 180/227 |

FOREIGN PATENT DOCUMENTS

| | | |
|---|---|---|
| DE | 199 41 867 A1 | 3/2000 |
| JP | 3452847 B2 | 7/2003 |

OTHER PUBLICATIONS

Silicon Valley Automation, AFAB(tm) Alignment Hardware Kit, Jan. 2005, 16 pages.*

* cited by examiner

*Primary Examiner* — Victor MacArthur
(74) *Attorney, Agent, or Firm* — Birch, Stewart, Kolasch & Birch, LLP

(57) ABSTRACT

A shaft support structure for a vehicle, capable of enhancing a degree of freedom for setting an assembly process of a to-be-supported member without the necessity of a dedicated tool. A collar is screwed in an internally threaded hole of one of pivot plates attached to a body frame with the collar being tightened using cut grooves formed at one end thereof. A gap is formed between the pivot plates and a pivot pipe as a to-be-supported member is adjusted. The pivot pipe is supported by the body frame via the support bolt with a washer being provided on the seating surface of the head section of the support bolt in the pivot plate. The washer is provided with projecting portions to be engaged with the cut grooves of the collar and is formed with outer circumferential cut grooves to be engaged with a given rotary tool.

14 Claims, 4 Drawing Sheets

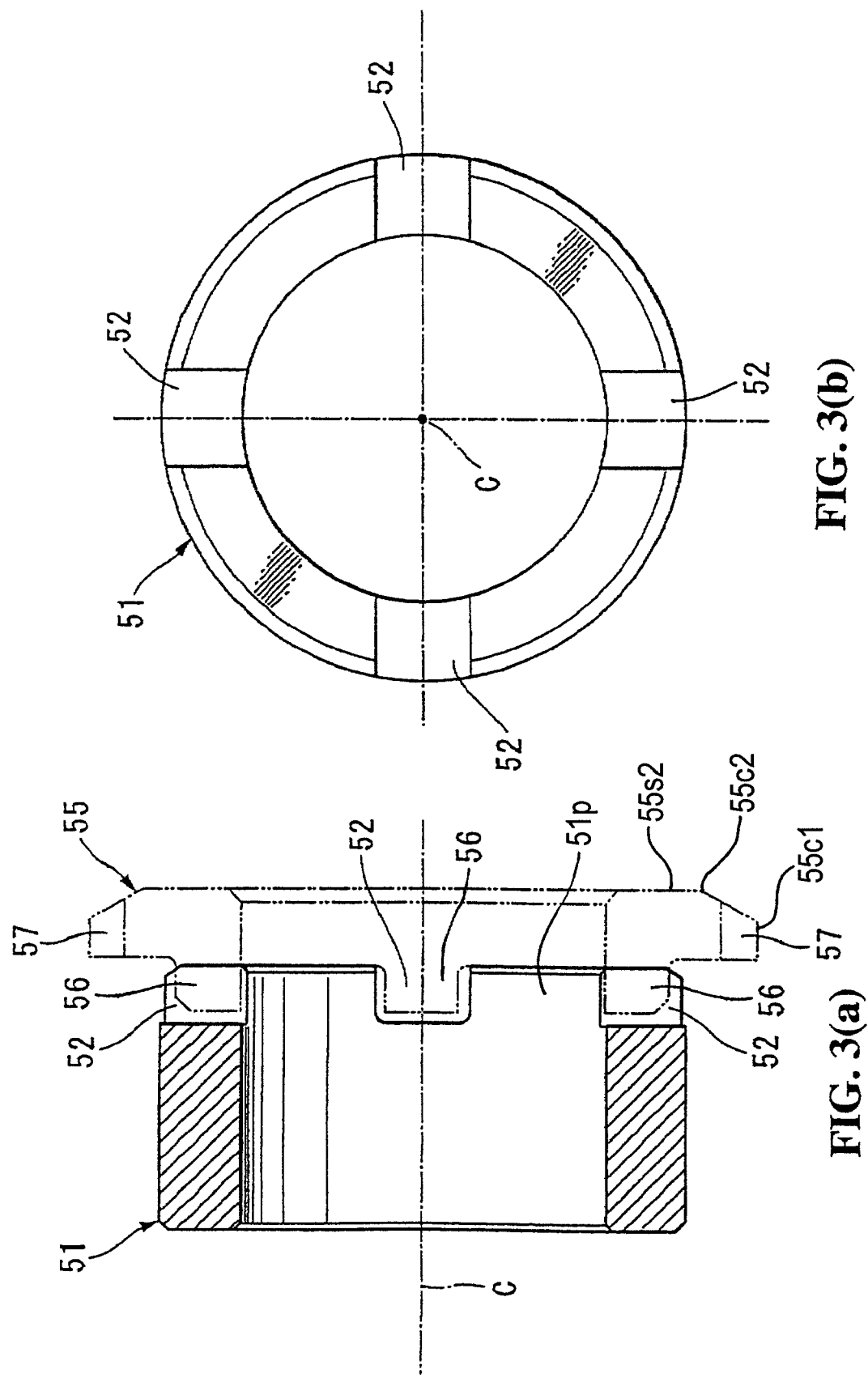

SHAFT SUPPORT STRUCTURE FOR A VEHICLE

CROSS-REFERENCE TO RELATED APPLICATIONS

The present application claims priority under 35 USC 119 to Japanese Patent Application No. 2005-338468 filed on Nov. 24, 2005 the entire contents of which are hereby incorporated by reference.

BACKGROUND OF THE INVENTION

1. Field of the Invention

The present invention relates to a shaft support structure for a vehicle such as a motorcycle.

2. Description of Background Art

A conventional shaft support structure is known wherein a vehicle component such as a to-be-supported member is supported by a body frame through a shaft-like support bolt. In this structure, a pair of left and right shaft support portions is provided on the body frame. The shaft support portions are each formed with an insertion hole for the support bolt. One of the insertion holes serves as an internally threaded hole formed with an internal thread on the internal circumference thereof. In addition, a collar is formed with an external thread on the external circumference thereof and is screwed in the internally threaded hole so as to enable the insertion of the support bolt therethrough. The collar is tightened by engaging a rotary tool with cut grooves formed at one end thereof. Thus, a gap between each of the shaft support portions and the to-be-supported member is adjusted based on the amount of tightening. See, Japanese Patent No. 3452847.

In addition, in the above conventional configuration, the collar is tightened by inserting a rotary tool into the internally threaded hole. Therefore, a dedicated rotary tool capable of being inserted into the internally threaded hole is needed in some cases. If the support bolt is inserted from the internally threaded hole side (the collar side), the head section of the support bolt will cover the cut grooves of the collar. For example, when the to-be-supported member is temporarily assembled at a supporting position, the support bolt cannot be inserted from the internally threaded side, which may prove to be a limitation with respect to an assembly process.

SUMMARY AND OBJECTS OF THE INVENTION

Accordingly, the present invention provides a shaft support structure for a vehicle, capable of enhancing a degree of freedom for setting an assembly process of a to-be-supported member without the necessity of a dedicated tool to be inserted into an internally threaded hole.

As means for solving the above problem, an embodiment of the present invention provides a shaft support structure for a vehicle, such as a motorcycle 1, in which a pair of left and right shaft support portions, for example left and right pivot plates 8, are provided on a body frame 5. The shaft support portions are each formed with an insertion hole 44 for a shaft-like support bolt 45. At least one of the insertion holes is made to serve as an internally threaded hole 44*a* formed with an internal thread on the internal circumference thereof. A collar 51 that is formed with an external thread on the external circumference thereof is screwed in the internally threaded hole so as to enable insertion of the support bolt therethrough, the collar is tightened using a rotation-purpose engaging portion, for example, the cut grooves 52, formed at one end thereof. A gap formed between each of the shaft support portions and a to-be-supported member, for example, the pivot pipe 41, is adjusted based on the amount of tightening, and the to-be-supported member is supported by the body frame. The shaft support structure including a washer 55 is provided on a seating surface of a head portion 48 of the support bolt in the shaft support portion provided with the collar or on a seating surface of a nut 49 screwed to the support bolt. The washer is formed with a first engaging portion 56 engaging the rotation-purpose engaging portion of the collar and with a second engaging portion, for example, the outer circumferential cut grooves 57 that is engaged with a given rotary tool 59.

According to an embodiment of the present invention, the second engaging portion of the washer is located on an outer circumferential side of the head section, of the support bolt, in contact with the washer or of a maximum outside diameter portion, for example, the flange portion 48*b*, of the nut.

According to an embodiment of the present invention, since the collar is tightened via the washer located outside the insertion hole, a dedicated rotary tool capable of being inserted into the internally threaded hole is not needed. Thus, the workability for adjusting the gap between the shaft support portion and the to-be-supported member can be enhanced. In addition, the co-tightened washer can be functioned as a loose stopper for the collar.

According to an embodiment of the present invention, when the to-be-supported member is temporarily assembled at a supporting position, a given rotary tool can be engaged with the second engaging portion while the second engaging portion is not covered by the head section of the support bolt or the nut. Consequently, the workability can be enhanced by eliminating an unnecessary limitation on an assembly process. In addition, an outside diameter of a portion provided with the second engaging portion is increased; therefore, the operation for tightening the collar can be performed with low torque.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3(*a*) and 3(*b*) are two-plane views of a collar provided in the pivot plate, wherein FIG. 3(*a*) is a cross-sectional view taken along the axis and FIG. 3(*b*) is a side view as viewed from the lateral outside; FIG. 3(b) is a side view as viewed from the lateral outside.

DETAILED DESCRIPTION OF THE PREFERRED EMBODIMENTS

Figure 1:
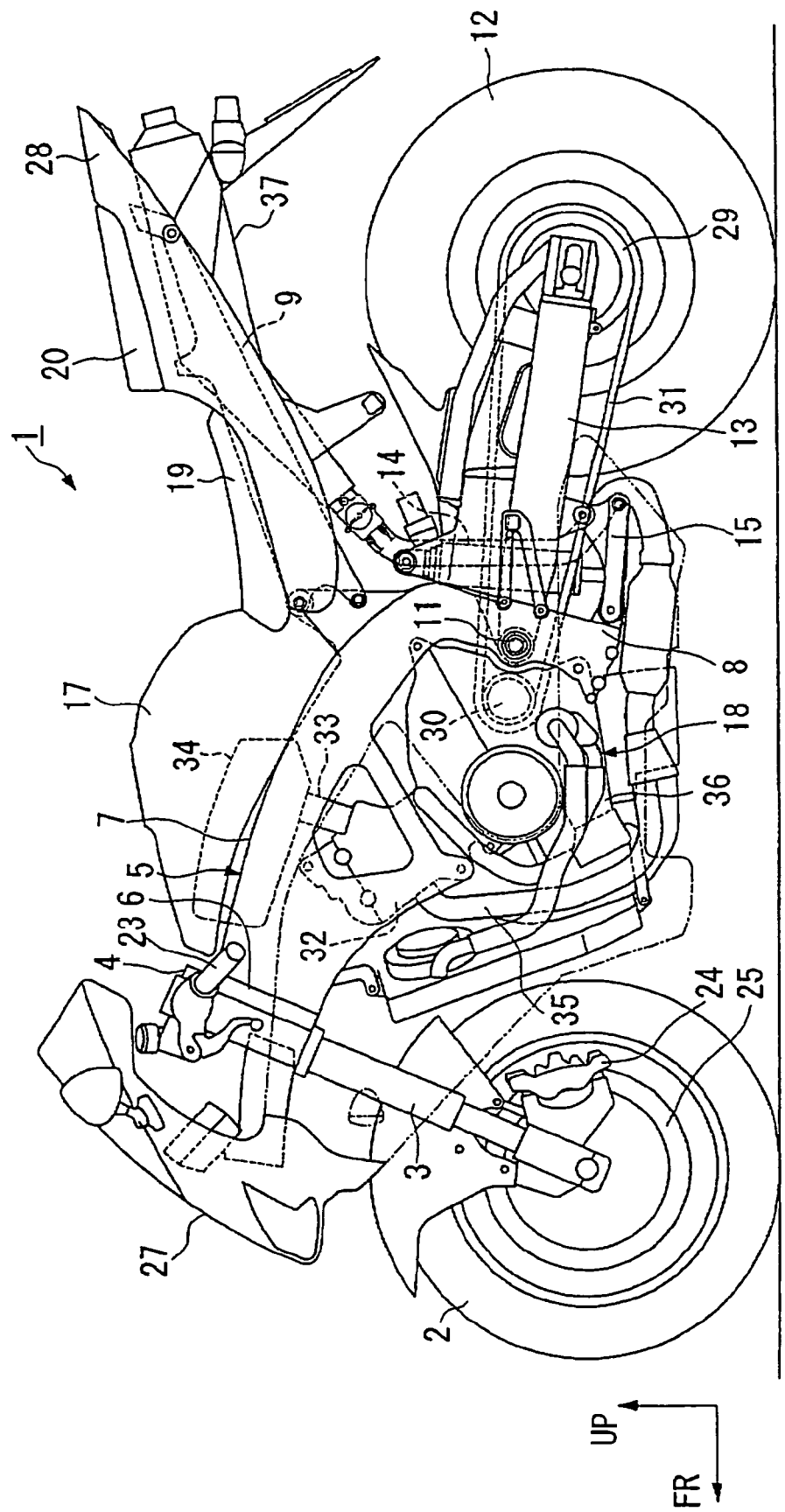
FIG. 1 is a side view of a motorcycle according to an embodiment of the present invention.
Figure 2:
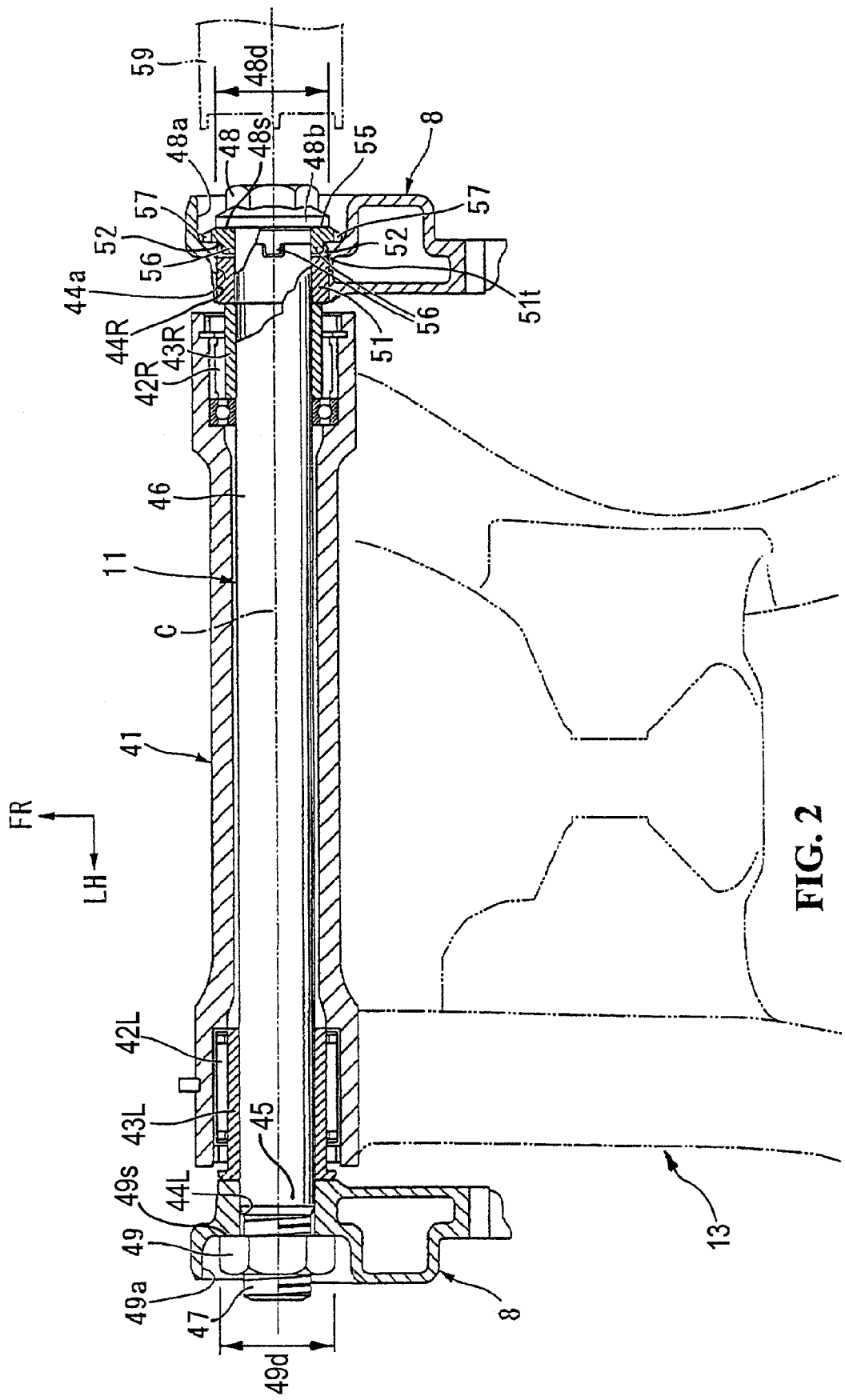
FIG. 2 is a cross-sectional view taking along the axes of a swing arm front end portion, pivot plates and the like of the motorcycle.

Embodiments of the prevent invention will be described below with reference to the drawings. Note that the directions of the front, back or rear, left and right are the same as that of a vehicle unless otherwise designated. In addition, in the drawings, arrow "FR" denotes the front of the vehicle, arrow "LH" denotes the left of the vehicle, and arrow "UP" denotes the upside of the vehicle.

As shown in FIG. 1, a pair of left and right front forks 3 rotatably support a front wheel 2 of a motorcycle (vehicle) 1. In addition, the front forks 3 are steerably and pivotally supported by a head pipe 6 of a body frame 5 via a steering stem 4. A pair of left and right main frames 7 extend rearwardly and obliquely downwardly from the head pipe 6, the rear ends thereof then bend downwardly and join to a pair of left and right pivot plates (shaft support portions) 8, respectively. A seat frame 9 extends rearwardly and obliquely downwardly and is joined at its front end to the rear portion of the main frame 7.

A swing arm 13 has a front end pivotally supported by the left and right pivot plates 8 via a laterally extending pivot shaft 11 so as to be vertically swingable. The rear end of the swing arm 13 rotatably supports a rear wheel 12. A shock absorber unit 14 is connected at its upper end to the front upper portion of the swing arm 13 and at its lower end to the pivot plate 8 at a position lower than the pivot shaft 11 via a link mechanism 15.

A fuel tank 17 is disposed above the main frame 7. An engine 18 or a motor for the motorcycle 1 is disposed below the main frame 7. A rider's seat 19 is disposed rearward of the fuel tank 17 with a rear fellow passenger's pillion seat 20 being disposed rearward of the seat 19.

Handlebars 23 are attached to the upper end of the front fork 3 and a brake caliper 24 is attached to the lower end of the front fork 3. Brake rotors 25 associated with the brake calipers 24 are attached on both sides of the front wheel 2.

The body front portion of the motorcycle 1 is covered by a front cowl 27 and the circumference of the seat frame 9 is covered by a rear cowl 28. A rear sprocket 29 is attached on the left side of the rear wheel 12. An endless drive chain 31 is spanned between the rear sprocket 29 and a drive sprocket 30 disposed on the rear left side of the engine 18.

The engine 18 is a parallel four-cylinder engine with a laterally extending crankshaft. A throttle body 33 for each cylinder is connected to the rear portion of the cylinder 32. Each throttle body 33 is joined to an air cleaner case 34 above the engine 18. Exhaust pipes 35 associated with respective cylinders extend from the corresponding front portions of the cylinder 32, bend downwardly, and are joined together as a single exhaust pipe at a position below the crankcase 36. Thereafter, the single exhaust pipe passes on the front right side of the swing arm 13, extends upwardly, and is coupled to a muffler 37 supported by the seat frame 9.

The swing arm 13 has a front end portion constructed as a pivot pipe (to-be-supported member) 41 that spans between both front ends of the swing sub-arms to extend from side to side. Left and right pivot collars 43L, 43R are respectively retained on the internal circumferences of left and right end portions of pivot pipe 41 via needle bearings 42L, 42R or the like. A pivot shaft 11 is inserted through the left and right pivot collars 43L, 43R. The inner circumferential surfaces of the left and right pivot collars 43L, 43R are substantially fitted to the outer circumferential surface of the pivot shaft 11. This determines the radially relative positions between the pivot shaft 11 and the pivot pipe 41. In this state, the pivot pipe 41 is supported by the pivot shaft 11 for rotation about its axis C. It should be noted that the swing arm 13 is configured to be asymmetrical as a matter of convenience for the layout of the exhaust pipes 35, the drive chain 31 and the like.

The left and right pivot plates 8 are coaxially formed with insertion holes 44L, 44R wherein the pivot shaft 11 is laterally inserted therethrough. The left and right ends of the pivot shaft 11 inserted through the respective insertion holes 44L, 44R are supported by the left and right pivot plates 8, respectively. The pivot shaft 11 is constructed as a stepped support bolt 45 with a long shaft section 46.

The support bolt 45 is inserted from, for example, the right side of the vehicle body in such a manner that its shaft section 46 passes through the left and right pivot plates 8 and the pivot pipe 41. A thread portion 47 of the shaft portion 46 on the leading end side thereof projects outward from the pivot plate 8 on the left side of the vehicle body. A nut 49 is threaded on and tightened to the threaded portion 47 to rotatably hold the pivot pipe 41 between the left and right pivot plates 8. Thus, the front end portion of the swing arm 13 is supported by the body frame 5 so that the swing arm 13 can be swingable up and down. Respective seating surfaces for a head section 48 of the support bolt 45 and the nut 49 are formed on the left and right external peripheries of the insertion holes 44L, 44R, respectively. In addition, conterbore portions 48a and 49a are formed to recess the associated seating surfaces toward the right and left insides, respectively.

In order to smoothly insert the pivot pipe 41 between the left and right insides of the left and right insertion holes 44L, 44R, the left and right pivot plates 8 are configured such that a distance between the left and right insides of the left and right insertion holes 44L, 44R is slightly greater than the lateral length of the pivot pipe 41. The left and right pivot plates 8 are formed integrally with a cross member, not shown, and the like by aluminum casting. Therefore, the pivot plates 8 will never be bent easily even by tightening the support bolt 45 and nut 49 thereto.

For this reason, in the motorcycle 1, the insertion hole 44R on the right side of the vehicle body is formed as an internally threaded hole 44a formed with an internal thread on the internal circumferential surface thereof. In addition, a collar 51 formed with an external thread on the external circumference thereof is screwed in the internally threaded hole 44a so as to enable the insertion of the pivot shaft 11. Screwing the collar 51 allows the inside end thereof to come into abutment against the outside end of the pivot pipe 41, thereby eliminating a gap between each of the pivot plates 8 and the pivot pipe 41. In this state, the support bolt 45 is inserted through the left and right pivot plates 8 and the pivot pipe 41, and the support bolt 45 and the nut 49 threaded thereto are tightened, whereby the front end of the swing arm 13 can be satisfactorily supported by the body frame 5 without play.

The inner circumferential surfaces of the left insertion hole 44 and collar 51 are substantially fitted to the outer circumferential surface of the shaft section 46 of the support bolt 45. This determines the radial position of the support bolt 45 relative to the left and right pivot plates 8. In other words, the radial position of the pivot pipe 41 with respect to the body frame 5 is determined through the support bolt 45.

On the other hand, the axial (lateral) position of the pivot pipe 41 relative to the body frame 5 is determined by the following abutments. The outside end of the pivot collar 43L on the left side of the pivot pipe 41 is abutted against the left and right inside peripheries of the insertion hole 44L in the left pivot plate 8. In addition, the outside end of the pivot collar 43R on the right side of the pivot pipe 41 is abutted against the inside end of the collar 51 screwed to the insertion hole 44R of the right pivot plate 8. It should be noted that the left and right pivot collars 43 are positioned with respect to the pivot pipe 41 axially as well as radially.

The head section 48 of the support bolt 45 is formed like a flange bolt and its maximum outside diameter portion, namely, its flange portion 48b has an outside diameter approximately equal to that of the collar 51. A washer 55 having a diameter larger than that of the flange portion 48b is provided on the seating surface side of the head section 48 in order to ensure an engaging margin for the seating surface of the head section 48 relative to the outer circumference of the internally threaded hole 44a. Thus, the head section 48 of the support bolt 45 can directly tighten the right pivot plate 8 via the washer 55. The inner circumferential surface of the washer 55 is substantially fitted to the outer circumferential surface of the shaft section 46 of the support bolt 45, whereby the radial relative position of the washer 55 can be determined with respect to the support bolt 45.

In addition, referring to FIG. 3(b), for instance, four cut grooves (engaging portions for rotation purpose) 52 shaped in a rectangular form as viewed radially are formed at the outer end of the collar 51 (the end on the side of the washer 55) so as to be equally spaced apart from each other in the circumferential direction.

Figure 4A:
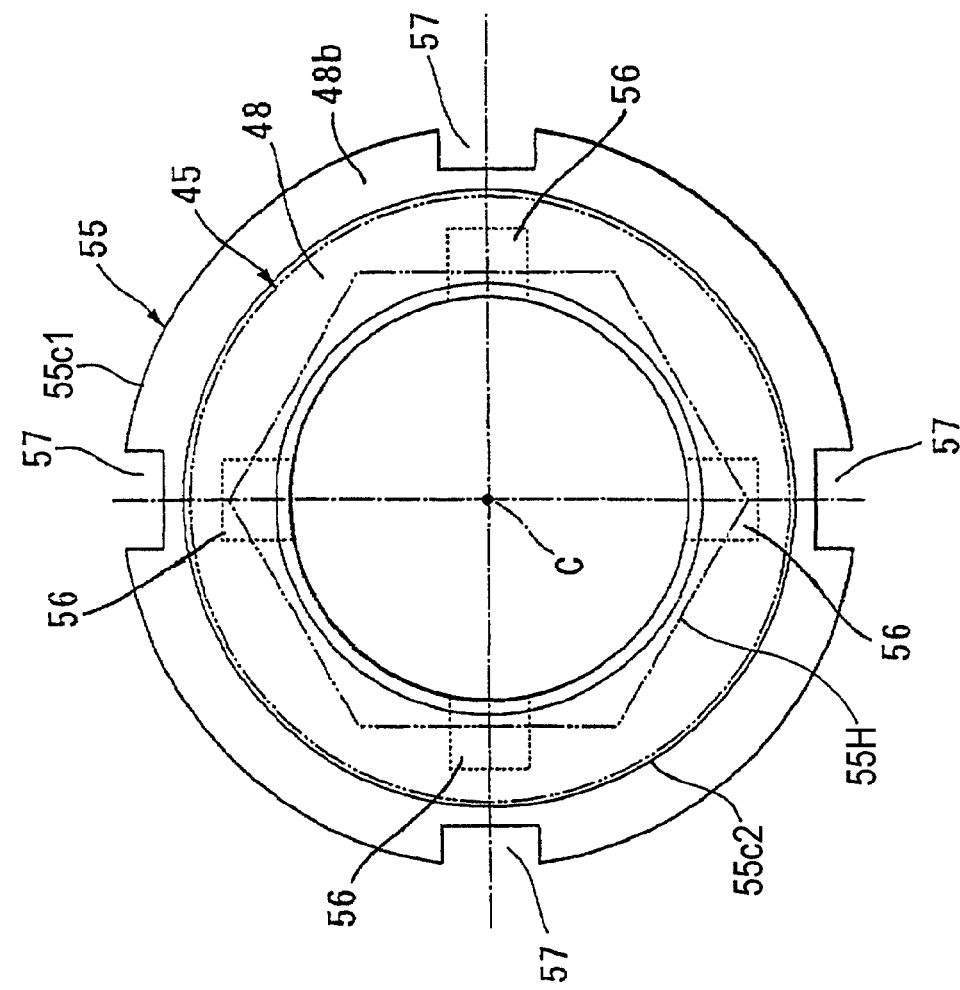
FIGS. 4(*a*) and 4(*b*) are two-plane views of a washer provided in the pivot plate, wherein FIG. 3(*a*) is a cross-sectional view taken along the axis
Figure 4B:
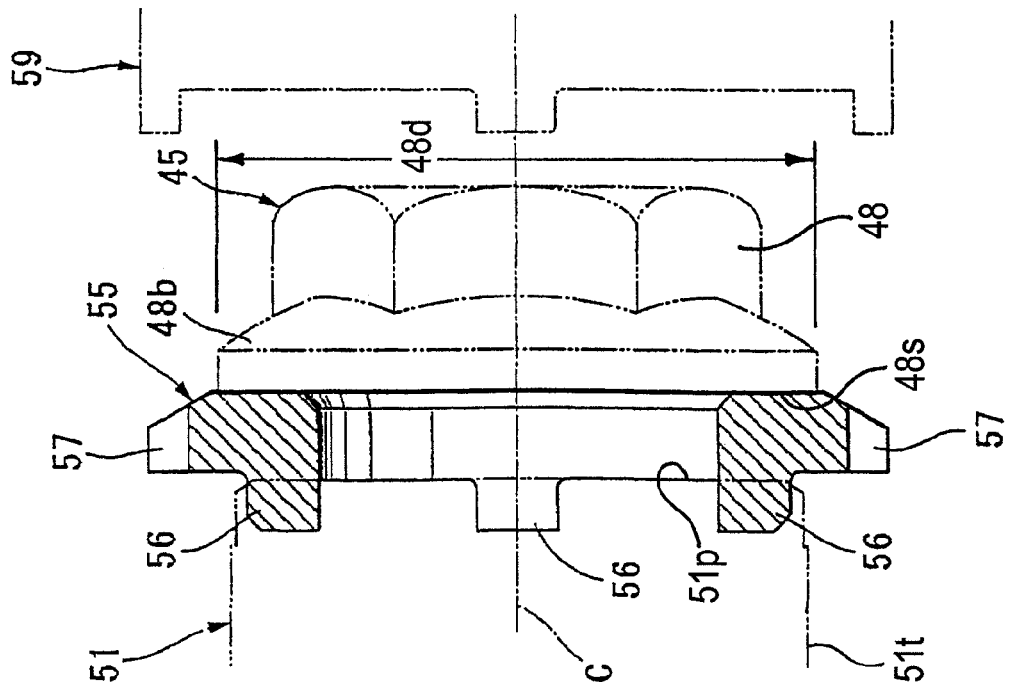

On the other hand, additionally referring to FIG. 4(b), for instance, four projecting portions (first engaging portions) 56 shaped in a rectangular form as viewed radially are formed at the inner end of the washer 55 (the end on the side of the collar 51) so as to be equally spaced apart from each other in the circumferential direction. The projecting portions 56 are each engaged with a corresponding one of the cut grooves 52 so as not to be relatively rotatable about the axis C with respect to the cut grooves 52 in a state where the washer 55 and the collar 51 are arranged coaxially with each other and the outside end of the collar 51 is made close to the inside end of the washer 55.

Outer circumferential cut grooves (second engaging portions) 57, that are adapted to engage with the leading end of a given rotary tool 59 for selective rotation about the axis C, are formed on the outer circumferential portion of the washer 55 at four positions on the radially outside of the projecting portions 56 (that is, so as to be equally spaced apart from each other in the circumferential direction). Each outer circumferential cut groove 57 is positioned on the outer circumferential side (radially outside) of the flange portion 48b of the head section 48 included in the support bolt 45. Thus, even in a state where the support bolt 45 is inserted through the collar 51, the outer circumferential cut grooves 57 can be engageable with the leading end of a tubular rotary tool 59 while not covered by the flange portion 48b.

A method of assembling the swing arm 13 to the body frame 5 is provided wherein first the collar 51 is temporarily assembled into the internally threaded hole 44a on the right side of the vehicle body (the inner end of the collar 51 does not projected from the inside end of the internally threaded hole 44a). In this state, the front end portion of the swing aim 13 is inserted between the left and right pivot plates 8. Thus, the pivot pipe 41 can be smoothly inserted between the left and right pivot plates 8.

Next, the washer 55 is disposed near the outside of the collar 51 and the projecting portions 56 are each engaged with a corresponding one of the cut grooves 52. In this state, the support bolt 45, except for the head section, is inserted from the right side of the vehicle body and the pivot pipe 41 is temporarily assembled between the left and right pivot plates 8 via the support bolt 45. In this case, the outer circumferential grooves 57 of the washer 55 are located on the radially outside of the flange portion 48b of the head section 48 included in the support bolt 45. Therefore, in the temporarily assembled state, the rotary tool 59 can be engaged with the outer circumferential cut grooves 57 and the collar 51 can be simultaneously rotated by rotating the washer 55.

The collar 51 is rotated together with the washer 55 in the tightening direction thereof by operating the rotary tool 59, whereby its inside end is brought into abutment against the outside end of the pivot collar 43R on the right side of the pivot pipe 41. In this case, the inside end of the washer 55 is spaced slightly apart from the outside end of the collar 51. However, the amount of spacing is sufficiently smaller than the engaging margin of the cut grooves 52 and the projecting portions 56. In this way, the gaps between the left pivot plate 8 and left pivot collar 43L, and the right pivot plate 8 and right pivot collar 43R are eliminated and then the support bolt 45 and nut 49 are tightened down. Thus, the front end portion of the swing arm 13 can be satisfactorily supported by the body frame 5 without play.

As described above, the shaft support structure for a vehicle according to the above embodiment is applied to the motorcycle configured as follows. The pair of left and right pivot plates 8 is attached to the body frame 5. The pivot plates 8 are each formed with the insertion hole 44L, 44R for the shaft-like support bolt 45. For instance, the insertion hole 44R on the right side of the vehicle body serves as the internally threaded hole 44a formed with an internal thread on the internal circumference thereof. In addition, the collar 51 formed with an external thread on the external circumference thereof is screwed in the internally threaded hole 44a so as to enable the insertion of the support bolt 45 therethrough. The collar 51 is tightened using cut grooves 52 formed at one end thereof, a gap between each of the pivot plates 8 and the pivot pipe 41 as a body to be supported is adjusted based on the amount of tightening, and then, the pivot pipe 41 is supported by the body frame 5 via the support bolt 45. In this configuration, the washer 55 is provided on the seating surface of the head section 48 of the support bolt 45 in the pivot plate 8 on the side where the collar 51 is provided. The washer 55 is provided with the projecting portions 56 engaged with the cut grooves 52 of the collar 51 and formed with the outer circumferential cut grooves 57 to be engaged with a given rotary tool 59.

With this configuration, the collar 51 can be tightened through the washer 55 located on the outside of the insertion hole 44R. Therefore, the dedicated rotary tool 59 capable of being inserted into the internally threaded hole 44a is not needed and workability for adjusting the gap between each of the pivot plates 8 and the pivot pipe 41 can be enhanced. In addition, the co-tightened washer 55 can function as a loose stopper for the collar 51.

In the above shaft support structure described above, the outer circumferential grooves 57 of the washer 55 are located on the outer circumferential side of the flange portion 48b, the maximum outer diameter portion, of the head section 48 of the support bolt 45 in contact with the washer 55. Therefore, when the pivot pipe 41 is temporarily assembled at the supporting position, the given rotary tool 59 can be engaged with the outer circumferential cut grooves 57 while the outer circumferential cut grooves 57 is not covered by the head section 48 of the support bolt 45. This can improve workability by eliminating unnecessary limitation on the assembly process. In addition, since the outside diameter of the portion formed with the outer circumferential cut grooves 57 is increased, the operation for tightening the collar 51 can be performed with low torque.

In addition, the invention is not limited to the above embodiment. For instance, another configuration may be applicable in which the support bolt 45 is inserted from the left side of the vehicle body. In other words, the collar 51 may be provided on the side of the nut 49 screwed on the support bolt 45. In this case, a usual flat washer or no washer is provided on the seating surface of the head section 48 of the support bolt 45 and the washer 55 of the present embodiment is provided on the seating surface of the nut 49. In addition, the outer circumferential cut grooves 57 may be provided on the outer circumferential side of the maximum outside diameter portion (the apexes of the hexagon) of the nut 49. Further, the collar 51 can be provided on both sides of the head section 48 of the support bolt 45 and the nut 49.

Alternatively, the collar 51 is provided with projecting portions in place of the cut grooves 52, the washer 55 is provided with cut grooves in place of the projecting portions 56, and the projecting portions may be engaged with the cut grooves in a manner of concavity and convexity engagement. Further, pins and corresponding pin holes may be used in place of the cut grooves 52 and the projecting portions 56. Large-sized hexagon shaped along the external circumference of the washer may be formed in place of the outer circumferential grooves 57 of the washer 55 and the rotary tool 59 may be engaged with the hexagon 55H.

The configuration of the above embodiment is just exemplary and can be modified in various ways without departing from the scope of the gist of the invention. For example, the embodiment can be applied to an engine mount portion, not to the swing arm support portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft support structure for a vehicle, comprising:
a pair of left and right shaft support portions provided on a body frame,
a support bolt extending through an insertion hole formed in each of the shaft support portions, at least one of the insertion holes being an internally threaded hole,
a collar formed with an external thread on an external circumference thereof, said collar being screwed in an internally threaded portion of one of the insertion holes so as to enable insertion of the support bolt therethrough, the collar is tightened using a rotation-purpose engaging portion formed at one end of the collar,
a gap between each of the shaft support portions and a supported member is adjusted based on an amount of tightening, and then the supported member is supported by the body frame, and
a washer provided on a seating surface of a head section of the support bolt in one of the shaft support portions provided with the collar, or on a seating surface of a nut screwed to the support bolt,
wherein the washer is formed with a first engaging portion engaging the rotation-purpose engaging portion of the collar, and a second engaging portion for engaging a given rotary tool,
wherein the second engaging portion is cut into an outer circumference of the washer which forms a groove opening in an axial direction toward the supported member.

2. The shaft support structure for the vehicle according to claim 1, wherein the second engaging portion of the washer is located further outside in a radial direction than an outer circumferential side of a flange portion of the head section of the support bolt which is in contact with the washer, or is located further outside in a radial direction than a maximum outside diameter portion of the nut.

3. The shaft support structure for the vehicle according to claim 2, wherein an entirety of the second engaging portion cut into an outer circumference of the washer is located further outside in a radial direction than the external thread on the external circumference of the collar.

4. The shaft support structure for the vehicle according to claim 1, wherein rotation-purpose engaging portion of said collar includes a groove for engaging with said washer for being rotated together therewith.

5. The shaft support structure for the vehicle according to claim 4, wherein the groove of said collar is provided for mating with the first engaging portion formed on said washer.

6. The shaft support structure for the vehicle according to claim 1, wherein an entirety of the second engaging portion cut into an outer circumference of the washer is located further outside in a radial direction than the external thread on the external circumference of the collar.

7. The shaft support structure for the vehicle according to claim 1, wherein each of the first engaging portion and the second engaging portion of said washer is arranged outward from a center of the washer in the same radial direction.

8. A shaft support structure for a vehicle, comprising:
a pair of left and right shaft support portions provided on a body frame,
a support bolt;
an insertion hole formed in each of the shaft support portions for accommodating the support bolt, the insertion holes being an internally threaded hole;
a collar formed with an external thread on the external circumference thereof, said collar being screwed in the internally threaded hole so as to enable insertion of the support bolt therethrough, said collar being adapted to be tightened by using a rotation-purpose engaging portion formed at one end of the collar;
a gap between each of the shaft support portions and a supported member is adjusted based on an amount of tightening; and
a washer provided on a seating surface of a head section of the support bolt in one of the shaft support portions provided with the collar or on a seating surface of a nut screwed to the support bolt;
wherein said washer is formed with a first engaging portion engaging the rotation-purpose engaging portion of the collar and a second engaging portion for engaging a given rotary tool,
wherein the second engaging portion is cut into an outer circumference of the washer which forms a groove opening in in an axial direction toward the supported member, and
wherein the support bolt is a vehicle pivot shaft.

9. The shaft support structure for the vehicle according to claim 8, wherein the second engaging portion of the washer is located further outside in a radial direction than an outer circumferential side of a flange portion of the head section of the support bolt which is in contact with the washer, or is located further outside in a radial direction than a maximum outside diameter portion of the nut.

10. The shaft support structure for the vehicle according to claim 9, wherein an entirety of the second engaging portion cut into an outer circumference of the washer is located further outside in a radial direction than the external thread on the external circumference of the collar.

11. The shaft support structure for the vehicle according to claim 8, wherein rotation-purpose engaging portion of said collar includes a groove for engaging with said washer for being rotated together therewith.

12. The shaft support structure for the vehicle according to claim 11, wherein the groove of the collar is for mating with the first engaging portion formed on said washer.

13. The shaft support structure for the vehicle according to claim 8, wherein an entirety of the second engaging portion cut into an outer circumference of the washer is located further outside in a radial direction than the external thread on the external circumference of the collar.

14. The shaft support structure for the vehicle according to claim 8, wherein each of the first engaging portion and the second engaging portion of said washer is arranged outward from a center of the washer in the same radial direction.

* * * * *